(No Model.) 9 Sheets—Sheet 1.
F. J. LUDINGTON.
MACHINE FOR MAKING BUTTON BACKS.
No. 376,895. Patented Jan. 24, 1888.
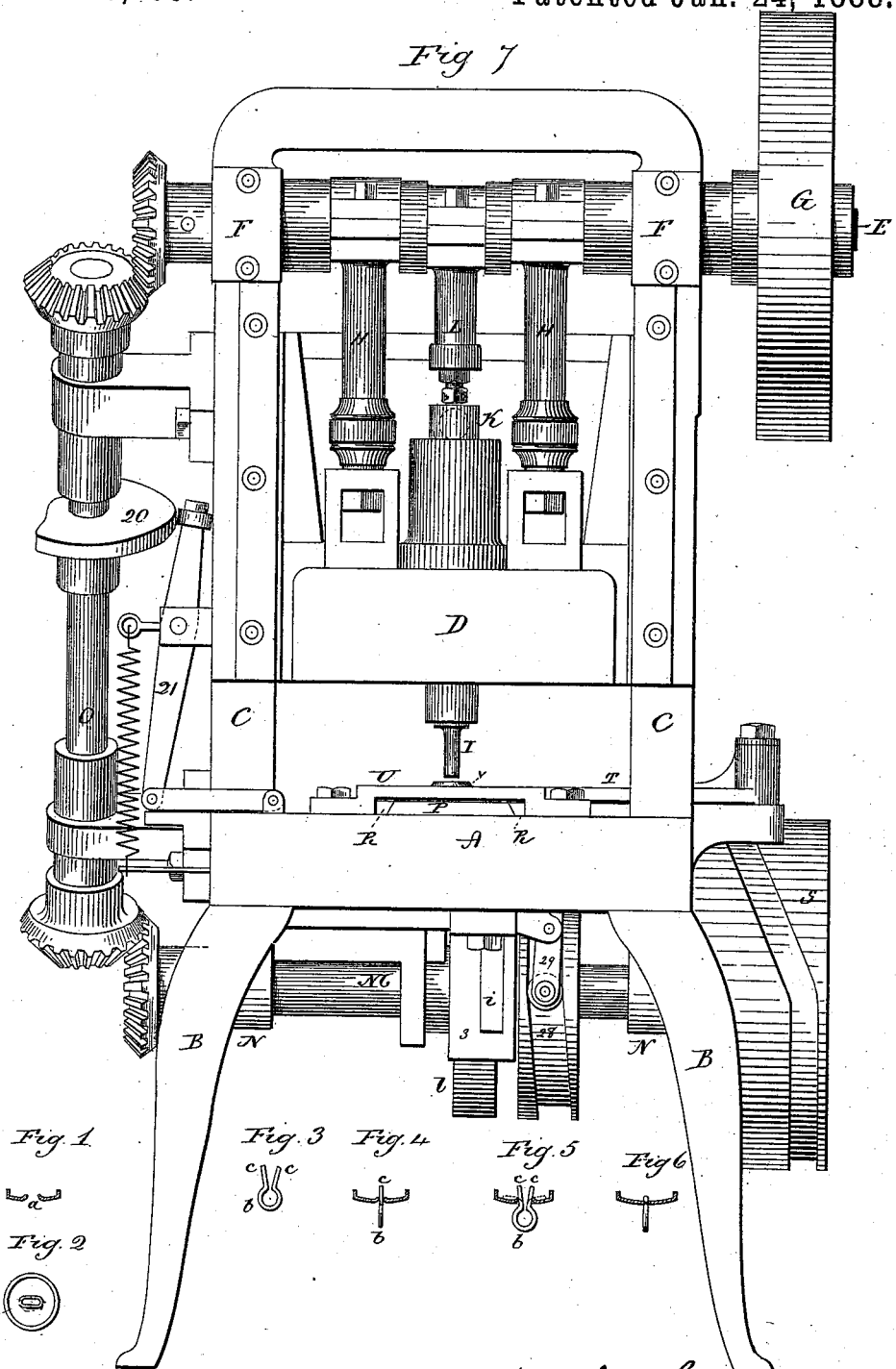

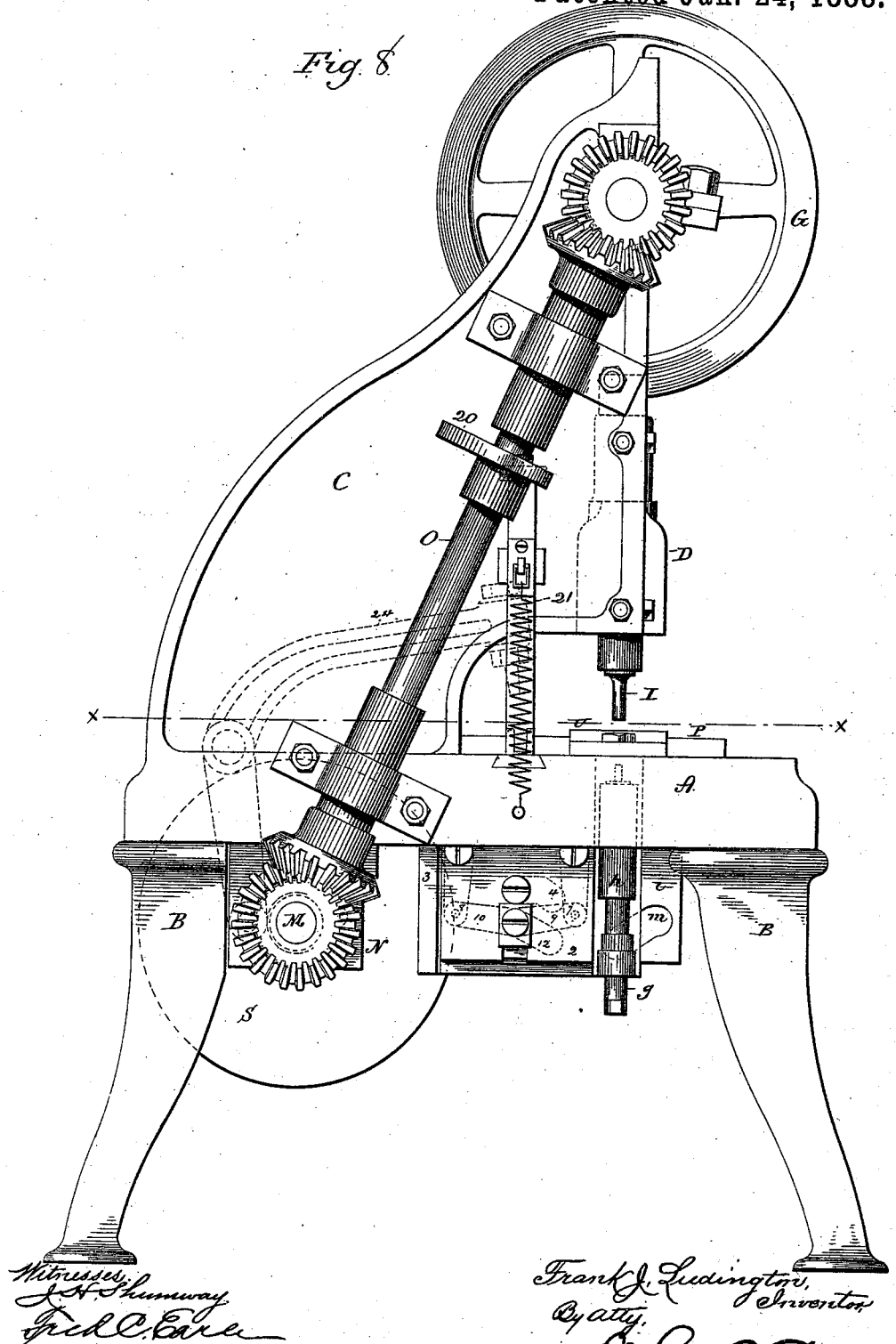

(No Model.) 9 Sheets—Sheet 3.

F. J. LUDINGTON.
MACHINE FOR MAKING BUTTON BACKS.

No. 376,895. Patented Jan. 24, 1888.

(No Model.) 9 Sheets—Sheet 4.

F. J. LUDINGTON.
MACHINE FOR MAKING BUTTON BACKS.

No. 376,895. Patented Jan. 24, 1888.

Witnesses
J. H. Shumway
Fred C. Earle

Frank J. Ludington, Inventor
By Atty.

(No Model.) 9 Sheets—Sheet 5.

F. J. LUDINGTON.
MACHINE FOR MAKING BUTTON BACKS.

No. 376,895. Patented Jan. 24, 1888.

(No Model.) 9 Sheets—Sheet 7.

F. J. LUDINGTON.
MACHINE FOR MAKING BUTTON BACKS.

No. 376,895. Patented Jan. 24, 1888.

(No Model.) 9 Sheets—Sheet 8.
F. J. LUDINGTON.
MACHINE FOR MAKING BUTTON BACKS.
No. 376,895. Patented Jan. 24, 1888.
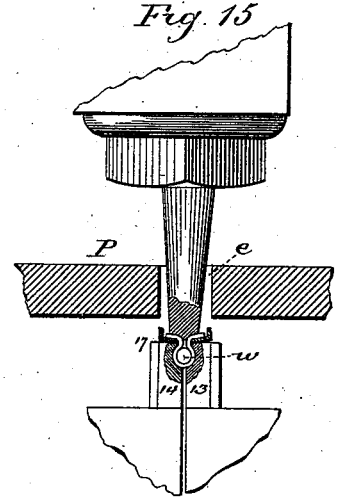
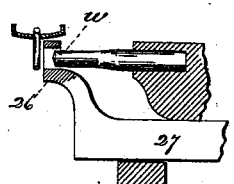
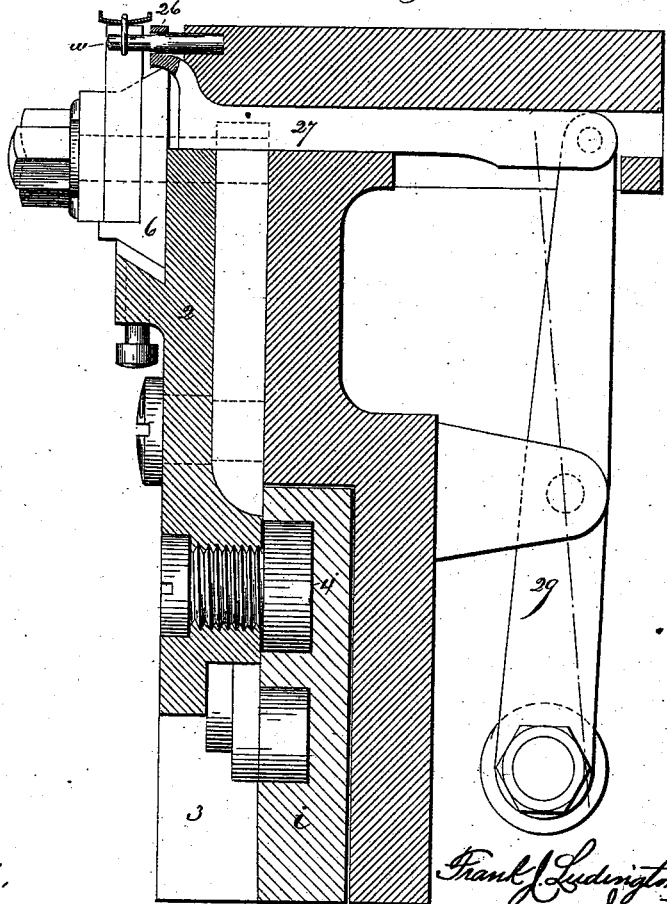
Witnesses:
J. H. Shumway
Fred C. Earle
Frank J. Ludington, Inventor,
By atty
Wm T. Earle (No Model.) 9 Sheets—Sheet 9.

F. J. LUDINGTON.
MACHINE FOR MAKING BUTTON BACKS.

No. 376,895. Patented Jan. 24, 1888.

Witnesses,
J. H. Shumway.
Fred C. Earle

Frank J. Ludington
Inventor
By atty.

UNITED STATES PATENT OFFICE.

FRANK J. LUDINGTON, OF WATERBURY, CONNECTICUT.

MACHINE FOR MAKING BUTTON-BACKS.

SPECIFICATION forming part of Letters Patent No. 376,895, dated January 24, 1888.

Application filed October 17, 1887. Serial No. 252,526. (No model.)

*To all whom it may concern:*

Be it known that I, FRANK J. LUDINGTON, of Waterbury, in the county of New Haven and State of Connecticut, have invented a new Improvement in Machines for Making Button-Backs; and I do hereby declare the following, when taken in connection with accompanying drawings and the letters of reference marked thereon, to be a full, clear, and exact description of the same, and which said drawings constitute part of this specification, and represent, in—

Figure 9:
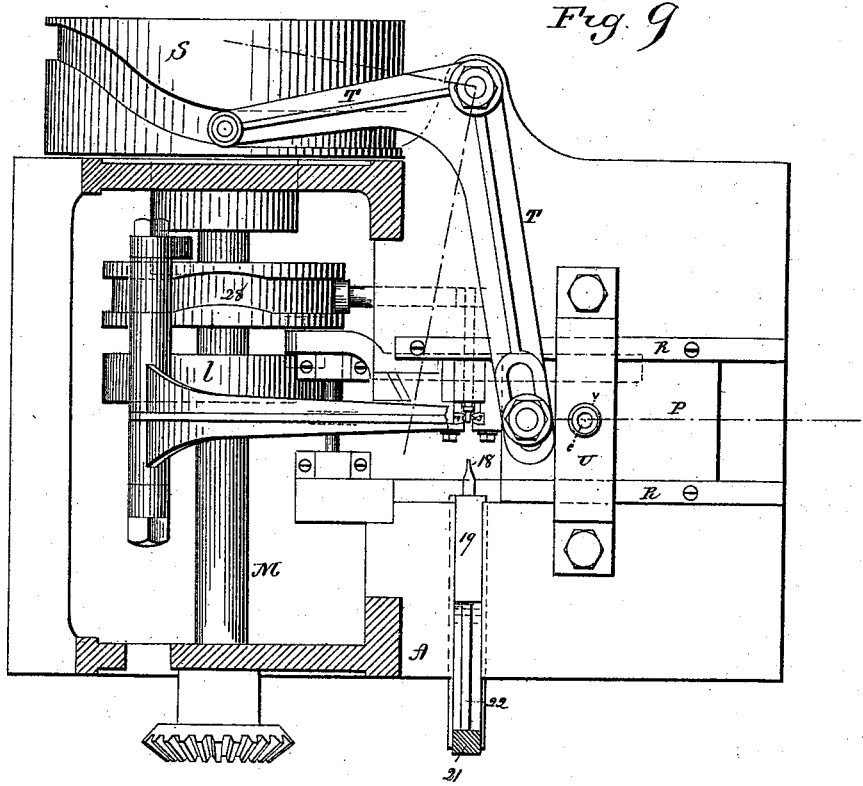
Figure 10:
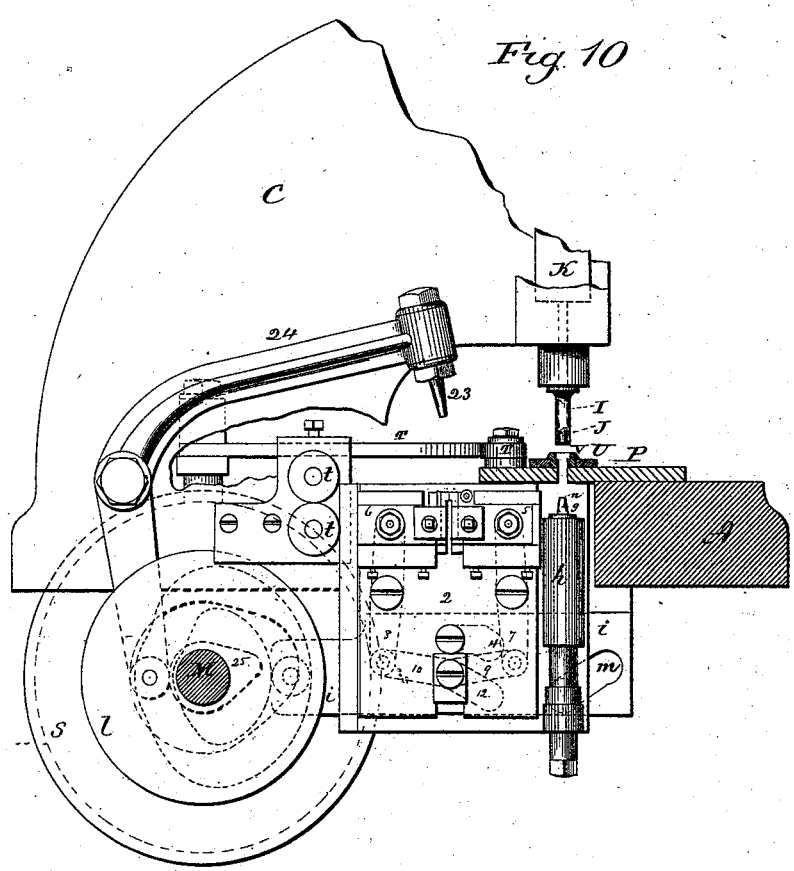
Figure 11:
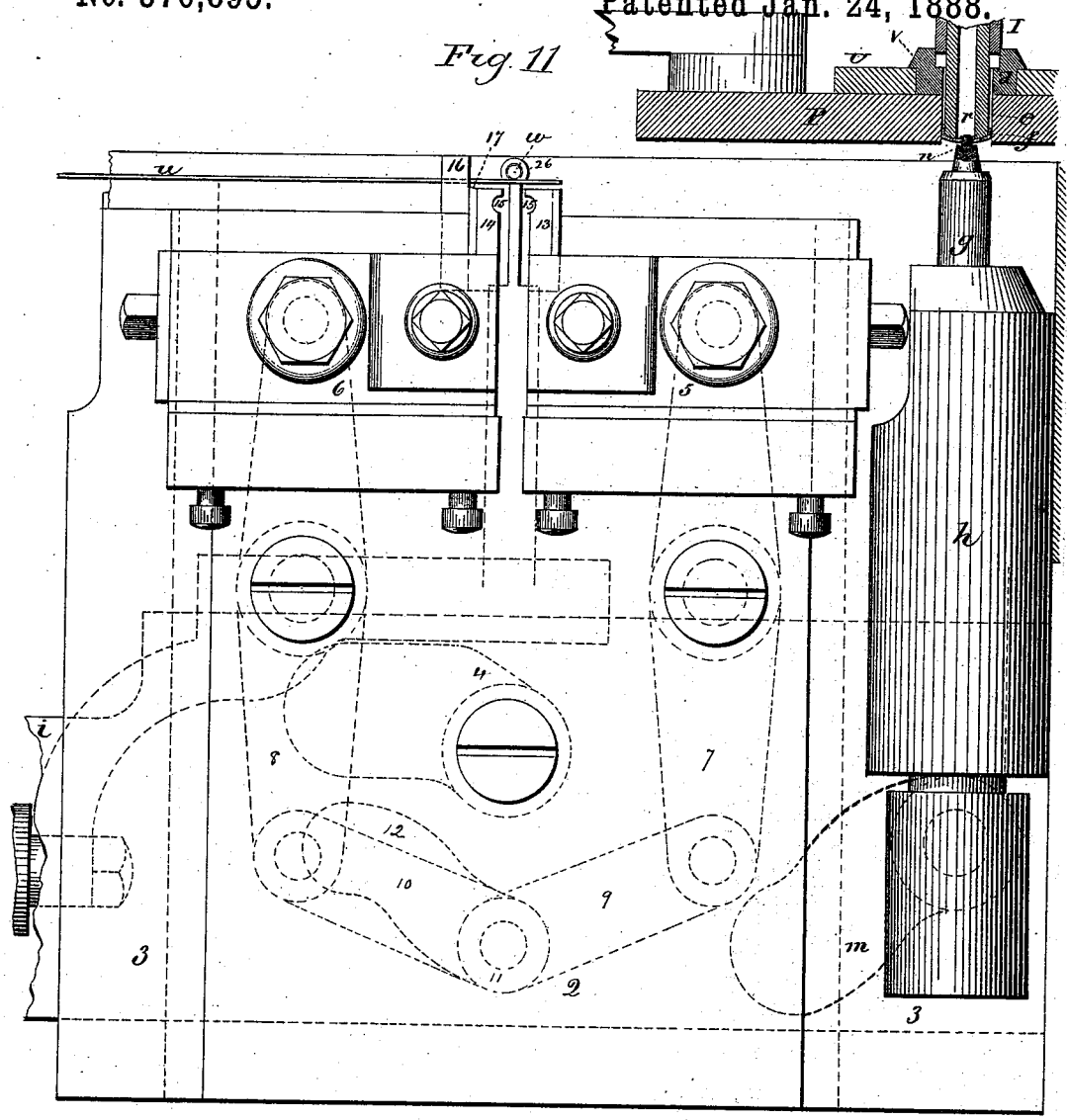
Figure 12:
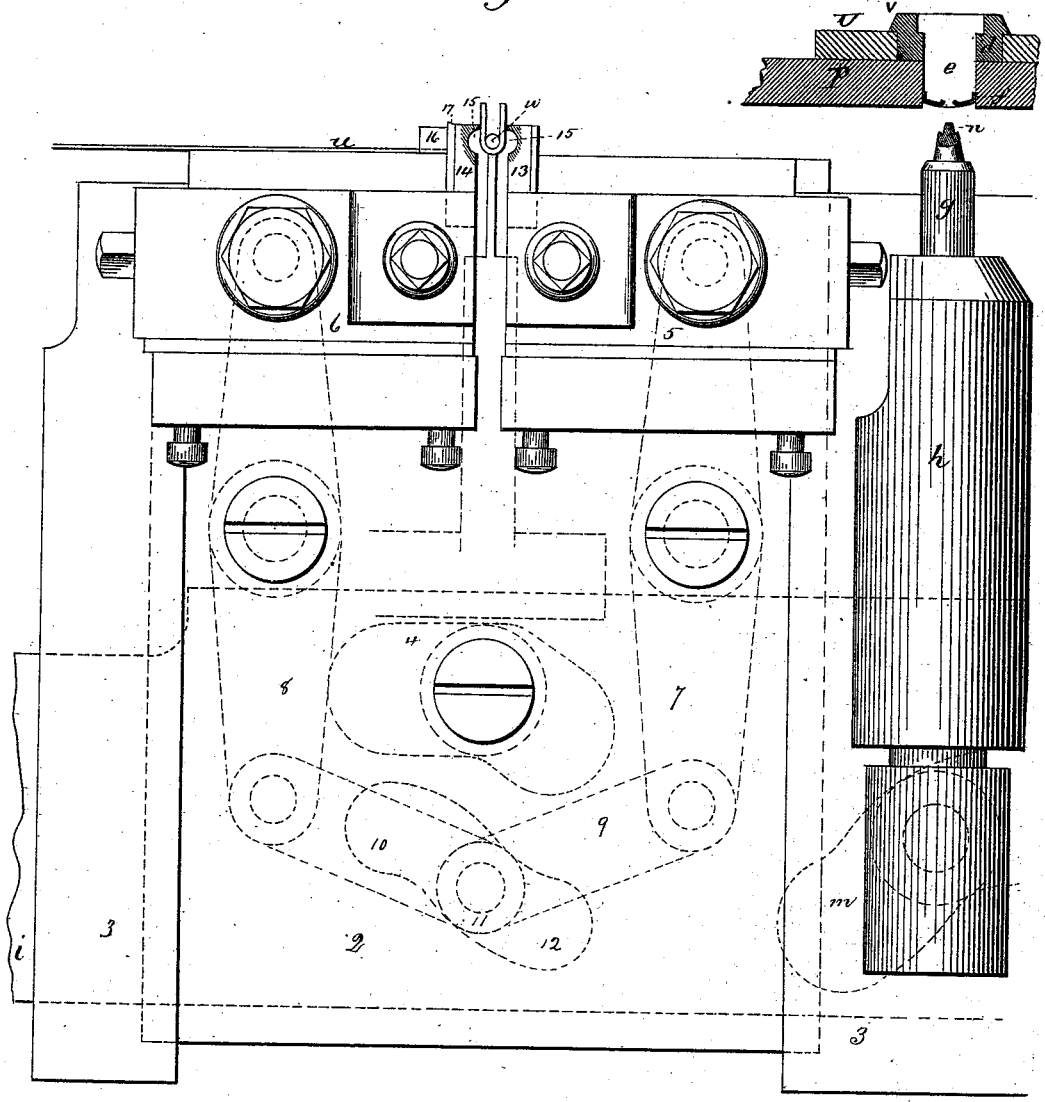
Figure 13:
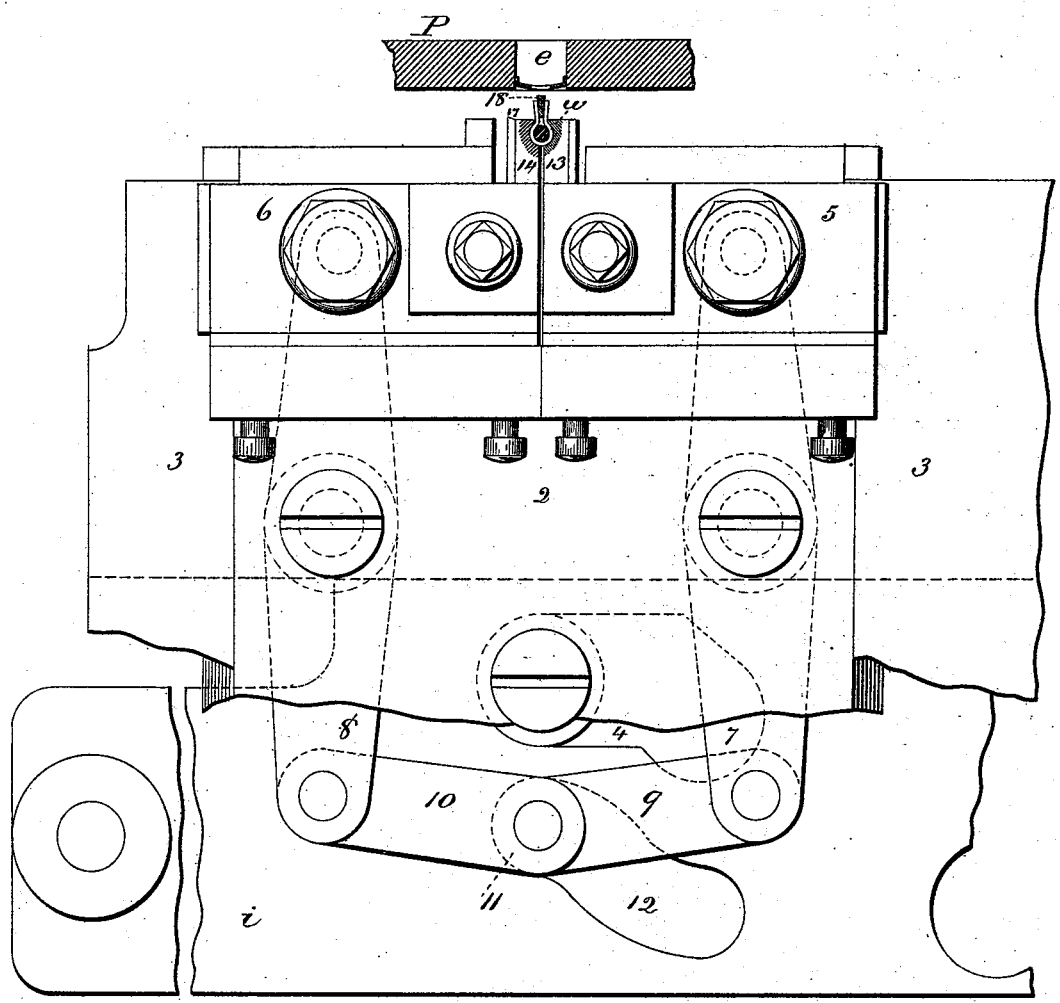
Figure 17:
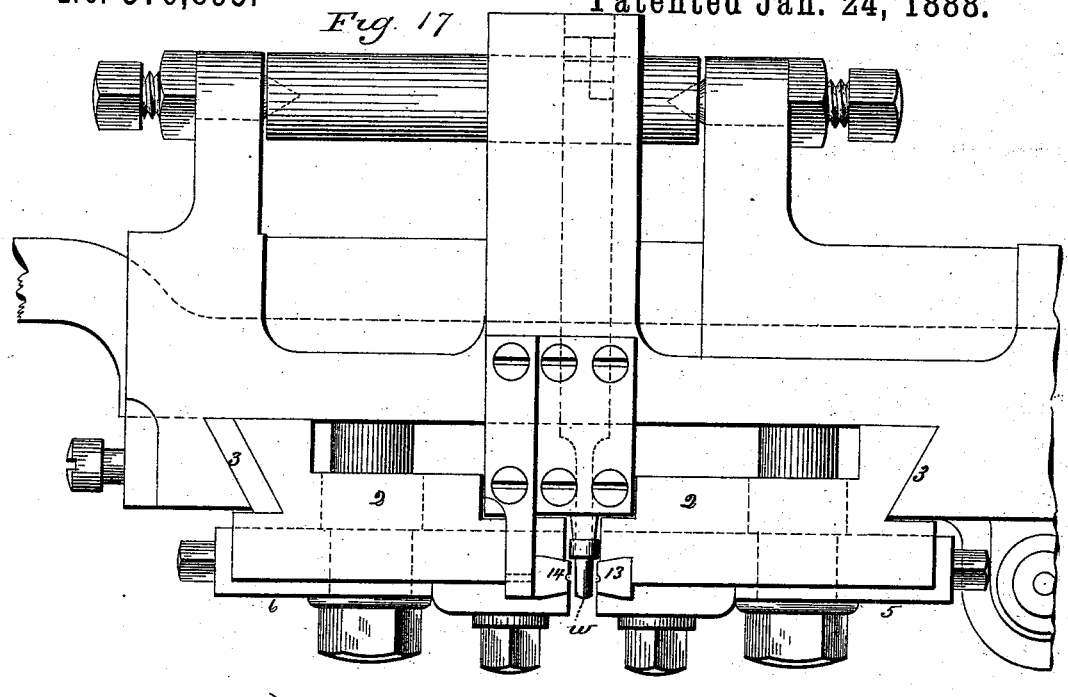
Figure 18:
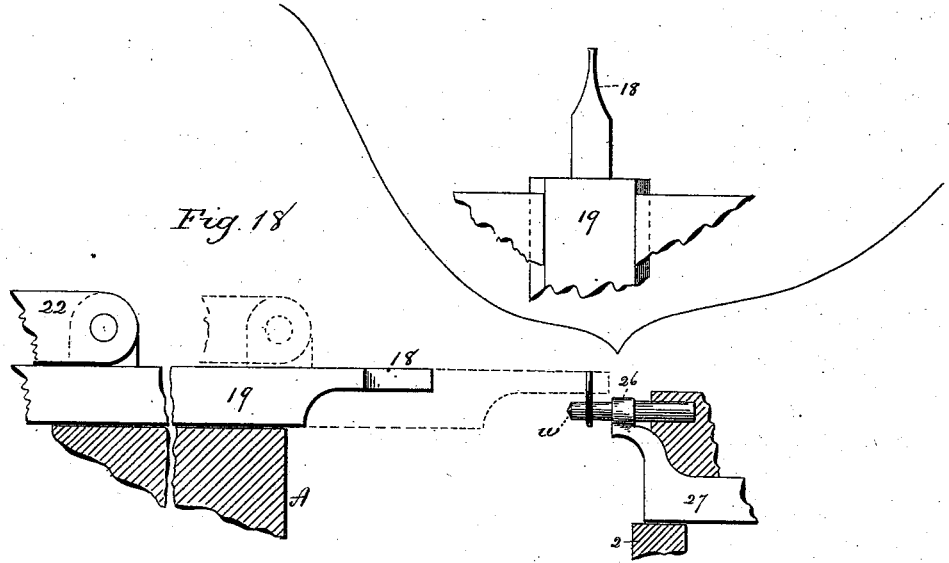

Figure 1, a section through the cup of a back as formed preparatory to its application to the eye; Fig. 2, a top view of the same; Fig. 3, the eye as bent preparatory to introduction to the cup; Fig. 4, the cup with the eye introduced, looking toward one edge of the eye; Fig. 5, the same as Fig. 4, looking against the face of the eye, also illustrating the legs of the eye as set upon the inside of the cup; Fig. 6, a central section of the cup and eye, cutting transversely through the eye; Fig. 7, a front view of the machine; Fig. 8, a side view of the machine, looking from the left; Fig. 9, a top view of the machine, portions broken away for convenience of illustration; Fig. 10, a vertical sectional side view; Fig. 11, a partial side view showing the eye-forming mechanism, and also showing the cup-forming mechanism in section in the position of having completed the cup; Fig. 12, the same as Fig. 11, showing the eye-forming mechanism as having performed its first step; Fig. 13, the eye-forming mechanism, having completed its work with the cup presented for the eye; Fig. 14, a vertical section, cutting through the slide *i*, illustrating the operation of the eye-forming devices; Fig. 15, a vertical section through the eye-forming devices, setting-punch, and transferring-slide, showing the parts in the position as completing the back; Fig. 16, a sectional side view of the eye-spindle and stripper as discharging the completed button-back; Fig. 17, a partial top view showing the eye-forming devices and the separator; Fig. 18, a side view of the separator and spindle, Figs. 11 to 18, inclusive, enlarged for convenience of illustration.

This invention relates to an improvement in machines for making that class of button-backs which consist of a cup-shaped disk having a wire eye attached thereto, the said cup being adapted to be secured to and form the back of buttons of various classes, such backs being a common and well-known article of manufacture.

The cups are made from disks of sheet metal struck into cup shape, as represented in Fig. 1. The center from the bottom side inward is pierced with an elongated hole, *a*, in the center, (see Fig. 2;) but in piercing this hole the metal is not removed, but, on the contrary, is turned inward, as represented in Fig. 1, forming a flange-like projection each side the opening *a*. The eye is made from wire, as seen in Fig. 3, the wire being doubled to form the eye *b*, the two legs *c c* brought nearly together and then diverging, as seen in Fig. 3. This eye is introduced through the pierced hole *a* in the cup, as seen in Fig. 4 and broken lines, Fig. 5, the legs *c c* projecting upon the inside. Then by a suitable instrument the two legs are closed down hard upon the inside of the cup, as represented in Fig. 5, and so as to grasp the cup between the turned-down legs and the eye proper. In this operation the metal on the sides of the opening *a* is closed down between the legs, as represented in Fig. 6.

The object of my invention is to combine in one machine contrivances of a simple character which will automatically punch the disks from the metal, draw the disk into cup shape, pierce the cup, receive the wire, cut and bend the eye, introduce the eye into the cup, set the legs of the eye upon the cup, and discharge the completed back from the machine.

A represents the bed of the machine supported upon legs B, and upon which the operative mechanism of the machine is arranged. Upon the bed, supported in guides in suitable uprights, C, is a vertical reciprocating slide, D. In the same uprights the driving-shaft E is arranged in suitable bearings, F F, and to which power is applied through a pulley, G, or otherwise, to cause the said shaft to revolve. The said slide D receives its reciprocating movement from eccentrics on the driving-shaft through connecting-rods H H, and the said slide carries a tubular punch, I, which is of a diameter corresponding to the cup required to be cut from the metal to produce the back. Within this tubular punch I is a punch, J. (See Figs. 10 and 11.) This internal punch is carried by a vertical slide, K, guided in the slide D concentrically with the punch I, and to this punch K an independent reciprocating movement is imparted from the driving-shaft through a connecting-rod, L. The two slides K and D, with their respective punches, operate in the usual manner for double-acting presses, and, in fact, the uprights, with the slides and punches and their connections with the driving-shaft, are substantially what is known as a "double-acting punching-press."

Below the bed is a counter-shaft, M, supported in suitable bearings, N, which is caused to revolve from the driving-shaft by means of an intermediate shaft, O, in bevel-gear connection with the driving-shaft E, and with the said shaft M, as seen in Figs. 7 and 8, so that the two shafts revolve with equal velocity. Upon the bed, immediately below the punches I J, a slide, P, is arranged in suitable guides, R, and in a path at right angles to the axis of the punch, the said slide being adapted to reciprocate between said guides in a plane at right angles to the axis of the said punches. To the slide P reciprocating movement is imparted from a cam, S, on the shaft M through a bell-crank lever, T T. (See Fig. 9.) Transversely across this slide is a saddle, U, supported on the bed at each side the slide, (see Fig. 9,) but independent of the slide. In this saddle U a die, V, is arranged directly beneath the punches I J. (See Fig. 11.) The cavity in the die V upon its upper face is of a shape corresponding to the punch I and such as commonly used for punching purposes. The cavity within the die, below its upper surface, is contracted to form a shoulder, d, and thence is open through to the slide P below, the diameter of the opening below the shoulder corresponding to the external diameter of the cup to be formed, and the diameter of the punch corresponds to the internal diameter of the cup to be formed, the die being substantially the shape commonly used in double-action presses for forming cups from sheet metal.

At the time the punches come into coaction with the die below an opening, e, in the slide P is brought directly below the opening through the die V, and the diameter of this opening corresponds to the external diameter of the cup, as seen in Fig. 11.

The metal from which the back is to be cut is placed over the die V, the punch I first descends and cuts a disk from the sheet and forces that disk into the upper portion of the cavity in the die V, then the punch J descends upon that cut disk and forces it down over the shoulder d of the die and into the cavity below, which draws the disk into cup shape, and the punch J, then continuing, forces that cup down into the opening e in the slide P, as seen in Fig. 11, f representing the cup so forced into the slide.

Below the punch and in axial line therewith a vertical slide, g, is arranged in a guide, h, and adapted for vertical reciprocating movement, as from the position seen in Fig. 10 to that seen in Fig. 11. The vertical reciprocating movement is imparted to the slide g by means of a transverse reciprocating slide, i, to which reciprocating movement is imparted by means of a cam, l. The said slide i is constructed with an oblique slot, m, (see Fig. 10 and broken lines, Fig. 11,) into which a stud on the slide g projects, as indicated in Figs. 8, 10, and 11, and so that as the slide i moves from the position indicated in Fig. 10 to that indicated in Fig. 11 the slide g will rise from the position indicated in Fig. 10 to that indicated in Fig. 11, and then as the slide i returns the slide g will return accordingly.

The slide g carries at its upper end a punch, n, which is of inverted V shape and corresponds to the piercing required to be made through the cup. The punch J has a vertical opening, r, in its face, larger than the punch n, and so that after the cup has been formed and brought to its position in the slide P, as seen in Fig. 11, the slide g rises and causes the punch n to pierce the cup, as represented in Fig. 11. This piercing of the cup does not remove the metal, as in punching, but turns the edges upward, as seen in Fig. 1, and as before described. This done, the cup is completed, the slide g drops, and the punches J I at the same time rise from the slide P, leaving the cup in the opening of the slide P, as seen in Fig. 12.

While the formation of the cup has been going on wire for the eye has been fed into the machine through feed-rolls t t, (see Fig. 10,) arranged for the purpose, the mechanism for driving the rolls not being shown, such a feeding device being a common and well-known device for feeding wire, and for which any known feeding device may be substituted, u, Figs. 11 and 12, representing the wire. The wire passes in beneath a spindle, w, which in shape corresponds to the interior of the eye to be produced. This spindle is stationary, and stands in a line at right angles to the path of the slide P and in a plane below the slide, as seen in Fig. 11. Below the spindle w is a vertical slide, 2, arranged in suitable guides, 3, and to which a vertical reciprocating movement is imparted by the slide i through a cam-shaped slot, 4, the slot represented in broken lines, Figs. 8, 11, 12, and 13, and also seen in Fig. 14, and so that under the reciprocating movement of the slide i, a vertical reciprocating movement is imparted to the slide 2, as from the position represented in Fig. 11, which is the down position, to that seen in Fig. 12, which is the up position, and return. The slide 2 carries upon one side two transverse slides, 5 and 6, one each side of a vertical line through the spindle w, as seen in Fig. 11, the said slides being supported in suitable guides, and to each of said slides a reciprocating movement is imparted from the slide i by means of levers, respectively, 7 8, (see Figs. 11 and 13,) hung upon the slide 2, and so as to swing in vertical planes, the upper arms of the levers hung to the respective slides 5 6, and the lower arms of the lever connected by links, respectively, 9 10, to a stud, 11, which works in a cam-shaped slot, 12, in the slide $i$, (see Fig. 13,) and so that as the slide $i$ moves from one extreme to the other and returns an up-and-down movement will be imparted to the stud 11, as from Fig. 13 to Fig. 11 and return, and such up-and-down movement of the stud 11 will correspondingly change the inclination of the links 9 10, the greater inclination, Fig. 11, causing the levers 7 and 8 to throw the two slides 5 and 6 away from each other, as seen in Fig. 11, or, raising the stud 11, will accordingly throw the two slides 5 6 toward each other. (See Fig. 13.)

The slide 5 carries one part, 13, of the eye-bending die and the slide 6 carries the other part, 14, of the bending-die. (See Fig. 11.) These dies extend above the slides, and their adjacent faces are formed with cavities 15, which correspond each to one-half the external shape of the eye to be formed.

As the wire is fed into the machine, as seen in Fig. 11, it passes through a stationary guide, 16, above the bending-dies 13 and 14 and below the spindle $w$, as seen in Fig. 11. The die 14 carries a cutter, 17, and so that as the dies rise under the action of the slide $i$, before described, the cutter 17 will cut from the wire a blank of a length sufficient to form the eye, that blank standing between the two dies 13 and 14 and the bender. The dies continuing to rise, one will pass up each side the spindle $w$, as seen in Fig. 12, and bend the wire into U shape. The upward movement of the dies 13 and 14 continues until the cavities 15 are brought into line with the spindle $w$, as represented in Fig. 12. Then the two slides 5 6 are forced toward each other, which causes the dies 13 and 14 to correspondingly approach each other and their cavities embrace the wire around the spindle and bend the eye into circular shape, as seen in Fig. 13, leaving the legs projecting above the dies 13 and 14, as seen in Fig. 13, except that the two legs will stand close together.

Before applying the cup to the eye it is necessary to separate the legs to some extent, and this is done by bending them outward, as indicated in Fig. 13. This bending is performed by a separator, 18. The separator is attached to or made a part of a slide, 19, arranged to reciprocate in a line parallel with but slightly above the spindle $w$, as seen in Figs. 17 and 18. The slide 19, carrying the separator 18, receives reciprocating movement from a cam, 20, on the shaft O, (see Fig. 7,) working through a lever, 21, connected by a link, 22, with the slide 19.

After the bending of the wire by the dies 13 and 14, before described, the separator 18 advances, as represented in broken lines, Fig. 18. Its forward end being sharp, readily passes between the two legs, as represented in Fig. 13 and in broken lines, Fig. 18, so as to spread the legs to a sufficient extent. Then the separator withdraws. In the meantime the slide P, under its reciprocating movement, has brought the prepared cup to a position directly over the formed eye, as seen in Fig. 13. Then the setting-punch 23, which is hung in a lever, 24, to which vibratory movement is imparted by a cam, 25, on the shaft M, is forced downward, as seen in Fig. 15, carrying the cup from the slide P down over the legs of the eye, the legs passing through the pierced hole in the cup. The point of the setting-punch strikes between the two legs of the eye, forcing them apart, and turns them downward until they are firmly set upon the inside of the cup, the cup resting on the upper end of the dies 13 and 14, as seen in Fig. 15. The shaped end of the setting-punch 23 also strikes the metal of the cup, which projects up each side of the piercing, and turns that metal inward between the legs, as represented in Fig. 6. This completes the operation, and the eye is firmly secured to the cup. This done, the setting-punch rises, the slide P returns to receive a second cup, and the dies 13 14 open and drop, leaving the completed back on the spindle $w$, as represented in Fig. 14.

To remove the completed button-back from the spindle and discharge it from the machine a ring-shaped stripper, 26, which surrounds the spindle, but back of the eye, as seen in Fig. 14, is arranged upon a slide, 27, below and parallel with the spindle, which stripper receives reciprocating movement from a grooved cam, 28, through a lever, 29. After the button-back has been completed, as before described, the stripper advances, as from the position seen in Fig. 14 to that seen in Fig. 16, and forces the completed back from the spindle, leaving it free to fall into any suitable conductor prepared for it to deliver it from the machine.

A second disk is cut, cupped, and pierced, a second eye is formed, the cup presented thereto, and the eye and cup set together, and so continuing the machine automatically cuts and forms the disk, forms the eye, unites the two, and delivers the back complete from the machine.

The separator may be omitted, as the setting-punch is adapted to enter between the two legs and deflect them sufficiently to turn them and set them upon the inside of the cup; but I prefer the separator to open the legs in advance of the setting-punch.

The eye-forming mechanism may be employed without the cup-forming devices—as, for illustration, the cups may be presented into an opening, $e$, stationary over the eye-forming mechanism, as may be illustrated in Fig. 15 by considering the slide P as a stationary plate; or any of the known cup-forming mechanisms and transferring devices may be employed to form and present the cup into its proper position above the eye-forming mechanism and below the setting-punch.

I claim—

1. In a machine for making button-backs, the combination of a cutting and drawing punch and a corresponding die adapted to cut the disk and form the cup for the back, a reciprocating slide arranged beneath said die and so as to reciprocate in a plane at substantially right angles to the axis of the die, the said slide having an opening through it corresponding to the external shape of the cup to be formed, a reciprocating punch below said slide and in line with the cup-forming punch, the said second punch adapted to pierce the cup, an eye-forming mechanism, substantially such as described, arranged in the line of reciprocation of the said slide, but below it, the reciprocating movement of the said slide being adapted to bring the formed pierced cup to a position over the eye, and a setting-punch arranged to pass down through the opening in the slide, substantially as described, and so as to transfer the cup from the slide onto the eye and set the legs of the eye thereon.

2. The combination of the cutting and drawing punches I J, the corresponding stationary die V, the reciprocating slide P, arranged beneath said stationary die, the said slide P constructed with an opening through it corresponding to the opening through the die and adapted to receive the cup formed by said punches and die, a vertically-reciprocating punch, n, below said slide and in line with the cupping-punch, the stationary spindle w, the horizontally and vertically reciprocating bending-dies 13 and 14, having cavities 15 in their face corresponding to the exterior surface of the eye to be formed, the said spindle and dies being in line with the reciprocating movement of the said slide P, but below it, and a vertically-reciprocating setting-punch, 23, over said spindle, substantially as and for the purpose described.

3. The combination of the cutting and drawing punches I J, the corresponding stationary die V, the reciprocating slide P, arranged beneath said stationary die, the said slide P constructed with an opening through it corresponding to the opening through the die and adapted to receive the cup formed by said punches and die, a vertically-reciprocating punch, n, below said slide and in line with the cupping-punch, the stationary spindle w, the horizontally and vertically reciprocating bending-dies 13 and 14, having cavities 15 in their faces corresponding to the exterior surface of the eye to be formed, the said spindle and dies being in line with the reciprocating movement of the said slide P, but below it, a reciprocating separator, 18, and a vertically-reciprocating setting-punch, 23, over said spindle, substantially as described.

4. The combination of a cup-forming and transfer mechanism, substantially such as described, with a stationary spindle, w, the horizontally and vertically reciprocating dies 13 and 14, the said dies 13 and 14 having cavities 15 formed in their respective faces, and a setting-punch, 23, with a reciprocating stripper, 26, substantially as described.

5. The combination of a reciprocating slide, P, having an opening through it adapted to receive a cup for a button-back, the mechanism, substantially such as described, for cutting and forming the cup and introducing the same into said openings in the said slide, the spindle w, the horizontally and vertically reciprocating bending-dies 13 and 14, the said spindle and dies arranged in line with the reciprocation of the said slide P, but below it, the reciprocation of the said slide P being adapted to bring the opening therein carrying the cup directly over said spindle, a feed for the wire, a wire-guide, 16, through which the said wire is led between the spindle and said bending-dies, one of said bending-dies 14 provided with a cutter, 17, working against the face of the guide 16, and the setting-punch 23, substantially as and for the purpose described.

6. An eye-forming device for button-backs consisting of the reciprocating slide 2, a slide, i, reciprocating in a plane parallel with said slide 2, but at right angles thereto, slides 5 and 6, arranged in guides in said slide 2 at right angles to the path of movement of said slide 2, the said slide i constructed with a cam-groove, 4, into which a stud from the slide 2 extends, whereby reciprocating movement is imparted to said slide 2, lever 7 8, hung upon said slide 2, one end of each, respectively, connected to said slides 5 6, a cam-shaped groove, 12, in said slide i, and links 9 10, one end of each connected, respectively, with the said levers 7 8, the other ends of said links connected by a stud, 11, working in said cam-groove 12 in the slide i, substantially as described.

FRANK J. LUDINGTON.

Witnesses:
A. M. BLAKESLEY,
WM. B. MERRIMAN.